(12) United States Patent
Sutardja et al.

(10) Patent No.: US 7,535,955 B1
(45) Date of Patent: May 19, 2009

(54) METHODS, ALGORITHMS, SOFTWARE, ARCHITECTURES, SYSTEMS AND CIRCUITRY FOR ADAPTIVE FILTERING AND/OR MINIMIZING A SEQUENCE DETECTOR ERROR RATE

(75) Inventors: Pantas Sutardja, San Jose, CA (US); Toai Doan, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 926 days.

(21) Appl. No.: 10/623,031

(22) Filed: Jul. 17, 2003

Related U.S. Application Data (60) Provisional application No. 60/457,661, filed on Mar. 25, 2003.

(51) Int. Cl.
*H03K 5/159* (2006.01)

(52) U.S. Cl. .................... 375/232; 375/229; 375/343; 367/45

(58) Field of Classification Search ............... 375/232, 375/229, 233, 316, 152, 343; 367/45
See application file for complete search history.

(56) References Cited

U.S. PATENT DOCUMENTS

| | | | |
|---|---|---|---|
| 5,381,359 | A | 1/1995 | Abbott et al. |
| 5,432,816 | A | 7/1995 | Gozzo |
| 5,734,598 | A | 3/1998 | Abbott et al. |
| 6,023,383 | A | 2/2000 | Glover et al. |
| 6,115,433 | A | 9/2000 | de Lantremange |
| 6,142,942 | A | 11/2000 | Clark |
| 6,285,709 | B1 * | 9/2001 | Alelyunas et al. ........... 375/233 |
| 6,304,400 | B1 | 10/2001 | Schneider |
| 6,307,694 | B1 | 10/2001 | Du et al. |
| 6,373,910 | B1 | 4/2002 | Kingston et al. |
| 6,381,085 | B1 | 4/2002 | Du et al. |
| 6,633,894 | B1 * | 10/2003 | Cole ........................ 708/300 |
| 6,768,796 | B2 * | 7/2004 | Lu .......................... 379/406.08 |
| 2002/0097795 | A1 * | 7/2002 | Xia et al. .................... 375/233 |
| 2003/0023650 | A1 | 1/2003 | Papathanasiou |

FOREIGN PATENT DOCUMENTS

WO WO-00/51260 A1 8/2000

OTHER PUBLICATIONS

Bergmans, Digital Baseband Transmission & Recording, 1996, 373-450, Kluwer Acad. Pub. Dordrecht NL.

* cited by examiner

*Primary Examiner*—Mohammad H Ghayour
*Assistant Examiner*—Leila Malek (57) ABSTRACT

Methods, algorithms, software, architectures, systems and circuits for targeting certain dominant error types in an adaptive FIR filter and/or signal equalizer. The method and algorithm generally include processing a data sequence in accordance with the adaptive algorithm to produce a processed data sequence, filtering the data sequence to generate a filtered data term for the adaptive algorithm, generating a filtered error term for the adaptive algorithm from at least the processed data sequence, and updating the adaptive algorithm in response to the filtered data and error terms. The architectures generally include an equalizer configured to equalize and/or filter a data sequence and provide an equalized data output, a first filter configured to receive the data sequence and generate a filtered data term for the adaptive algorithm, and an error term circuit configured to receive the equalized data output and provide a filtered error term for the adaptive algorithm.

68 Claims, 8 Drawing Sheets

FIG. 1

(RELATED ART)

FIG. 2

(RELATED ART)

|  |   |   |   |   |   |   |   |   |
|------|---|---|---|---|---|---|---|---|
| S    | 0 | 0 | 0 | 1 | 0 | 0 | 0 | 0 |
| S_exp| 0 | 0 | 0 | 0 | 0 | 0 | 0 | 0 |
| error| 0 | 0 | 0 | 1 | 0 | 0 | 0 | 0 |

FIG. 4B

|  |   |   |   |   |   |   |   |
|------|---|---|---|----|---|---|---|
| S    | 0 | 1 | 1 | 0  | 0 | 1 | 0 | 1 |
| S_exp| 0 | 1 | 1 | 1  | 0 | 1 | 0 | 1 |
| error| 0 | 0 | 0 | -1 | 0 | 0 | 0 | 0 |

FIG. 5

| | | | | |
|---|---|---|---|---|
| s | 0 | 1 | 1 | 0 |
| S_exp | 1 | 0 | 0 | 1 |
| error | -1 | 1 | 1 | -1 |

METHODS, ALGORITHMS, SOFTWARE, ARCHITECTURES, SYSTEMS AND CIRCUITRY FOR ADAPTIVE FILTERING AND/OR MINIMIZING A SEQUENCE DETECTOR ERROR RATE

RELATED APPLICATIONS

This application claims the benefit of U.S. Provisional Application No. 60/457,661, filed Mar. 25, 2003.

FIELD OF THE INVENTION

The present invention generally relates to the field of adaptive algorithms, software and filters, and methods for minimizing a sequence detector error rate. More specifically, embodiments of the present invention pertain to methods, algorithms, software, architectures, systems and circuits for targeting certain dominant error types in an adaptive FIR filter and/or signal equalizer.

DISCUSSION OF THE BACKGROUND

Figure 1:
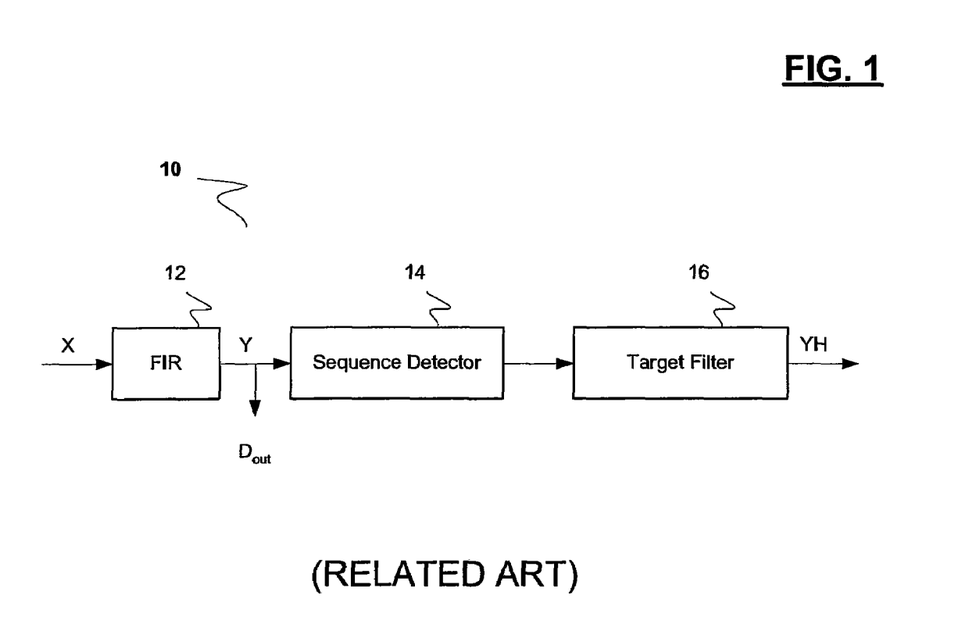
FIG. 1 is a diagram showing a conventional regular LMS gradient FIR filtering system/architecture.

Finite impulse response (FIR) channel filters are the most commonly used type of digital equalizer for commercially produced digital receivers. FIG. 1 shows a block diagram of a system 10 employing such a filter. A digital data signal X is received in FIR filter or equalizer 12, which filters the signal X according to a filtering algorithm (discussed in more detail below) to produce an equalized data signal Y. The equalized data signal Y is processed sequentially by a sequence detector 14 and a target filter 16 to produce an ideal, noiseless value YH for the equalized data signal. The difference between equalized data signal Y and its ideal, noiseless value YH is the error by which the filtering algorithm is adapted (see the discussion below). Such filters have a transfer function that generally satisfies the following equations:

$$\text{FIR filter}=(C0, C1, \ldots Cn) \quad (1)$$

$$Y[k]=C0*X[k]+C1*X[k-1]+C2*X[k-2]+\ldots+Cn*X[k-n] \quad (2)$$

where C is a weighting coefficient and Y[k] is the output of the filter.

Adaptive FIR filter algorithms generally allow for self-optimization of channel parameters. Regular least mean squares (LMS) gradient algorithms, which are the most common technique for adaptive FIR filtering, generally include a set of update rules for the coefficients of equations (1) and (2) above as follows:

$$C0=C0+\mu*E[k]*X[k] \quad (3)$$

$$C1=C1+\mu*E[k]*X[k-n] \quad (4)$$

$$\ldots$$

$$Cn=Cn+\mu*E[k]*X[k-n] \quad (5)$$

where $\mu$ is a weighting coefficient or factor that affects or controls the adaptation rate of the filter, and E[k] is the error in the Y[k] value relative to its ideal noiseless value (e.g., YH in the flow shown in FIG. 1).

Figure 2:
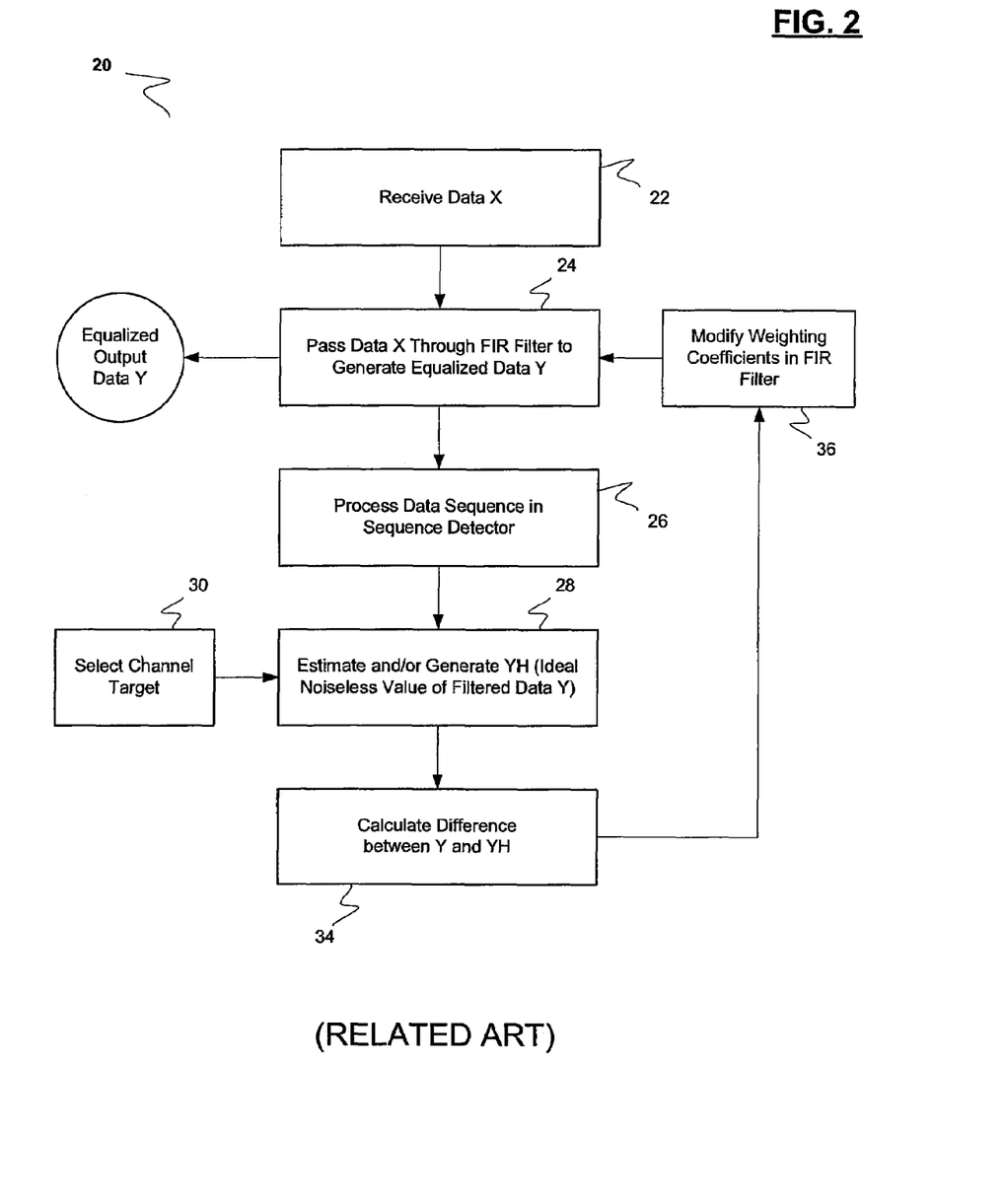
FIG. 2 is a flow chart for the conventional regular LMS gradient FIR filtering process of FIG. 1.

The ideal noiseless value YH is usually estimated and/or generated by convolving the output of the sequence detector with the target channel response (see step 28 in the flow chart 20 shown in FIG. 2). Thus, the next value of the coefficients Cx in equations (1) and (2) above depends on their previous value. The occasional errors in the estimated noiseless values due to detection errors do not materially impact the convergence of the regular LMS algorithm.

FIG. 2 shows a flow chart for a conventional adaptive filtering process 20 employing the system 10 of FIG. 1. The process begins with step 22, receiving a data signal X into a conventional data receiver circuit, system and/or apparatus. Step 24 generally involves passing the data X through an FIR filter (e.g., FIR filter 12 of FIG. 1) to generate equalized data signal Y. The primary function of FIR filter 12 is to output equalized data Y to a downstream receiving and/or processing device.

However, one may also train, update, correct and/or modify the filtering algorithm to ensure a desired or predetermined level of accuracy in the equalizing process. The first step of the conventional training sub-process is step 26, processing the equalized data signal in a sequence detector. Thereafter, in step 28, the sequence-detected equalized data signal is convolved with a target filter to estimate or generate YH. The target filter generally results from user selection of the channel target, which is generally an ideal sequence detector filter, in step 30. The difference between equalized data signal Y and ideal, noiseless equalized data signal YH is then calculated in step 34, and in step 36, that error information (i.e., a non-zero difference between Y and YH) is fed into the FIR filter to update and/or modify the weighting coefficients in the FIR algorithm.

The regular LMS algorithm reduces the root-mean-square (RMS) error of the E[k] values and generally results in a fairly low error rate after a period of time in which the coefficients converge. However, the lowest RMS error for Y[k] still does not equate to the lowest error rate for Viterbi detection. For example, in data receivers used in magnetic recording applications (e.g., read channel devices), errors are often dominated by simple error events such as single bit, dibit or tribit errors. Minimizing the RMS error in Y[k] indirectly minimizes these error events in some fashion, but not necessarily optimally. Conventional receivers and filtering algorithms tend to sacrifice performance in order to optimize detection of all types of error patterns. A need is thus felt for an approach that directly targets mninimizing one or more dominant or relatively frequent error events to improve or maintain detection performance and/or reduce convergence time.

SUMMARY OF THE INVENTION

Embodiments of the present invention relate to methods, algorithms, software, systems, architectures and circuitry for adaptively filtering a data stream that minimizes dominant error events. The method and algorithm, which are generally directed to modifying or updating an adaptive algorithm for processing data, generally comprise the steps of (a) processing a data sequence in accordance with the adaptive algorithm to produce a processed data sequence; (b) filtering the data sequence with a first set of filter characteristics to generate a filtered data term for the adaptive algorithm; (c) generating a filtered error term for the adaptive algorithm from at least the processed data sequence using a second set of filter characteristics, the second set of filter characteristics being similar to the first set of filter characteristics; and (d) updating the adaptive algorithm in response to the filtered data term and the filtered error term. The software is generally configured to implement one or more aspects of the inventive methods disclosed herein.

The present signal processing architecture generally comprises (i) an equalizer configured to equalize and/or filter a data sequence in accordance with an adaptive algorithm and provide an equalized data output; (ii) a first filter, configured to receive the data sequence and generate a filtered data term for the adaptive algorithm; and (iii) an error term circuit, configured to receive the equalized data output and provide a filtered error term for the adaptive algorithm, the error term circuit comprising a second filter having filter characteristics similar to the first filter. The present systems generally include the architecture and, for example, a receiver and/or magnetic recording device.

The present invention advantageously provides improved convergence speed relative to conventional LMS algorithms for FIR filtering of digital data, and approaching best-in-class adaptive LMS algorithms. At the same time, the present invention advantageously provides improved performance relative to LMS algorithms that are best-in-class for convergence speed. In certain embodiments, performance provided by the present invention may approach best-in-class LMS algorithms performance in reducing overall RMS error.

These and other advantages of the present invention will become readily apparent from the detailed description of preferred embodiments below.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or data processing system, or similar processing device (e.g., an electrical, optical, or quantum computing or processing device), that manipulates and transforms data represented as physical (e.g., electronic or magnetic) quantities. The terms refer to actions and processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture. Thus, the terms "process" and "function" (and grammatical variations thereof) may also refer to and encompass any circuit or block of circuitry that performs the process or function.

Furthermore, for the sake of convenience and simplicity, the terms "data," "data stream," "signal," "waveform," "sequence" and "information" may be used interchangeably, as may the terms "connected to," "coupled with," "coupled to" and "in communication with;" the terms "filter" and "convolve" (and grammatical variants thereof); and the terms "modify," "alter," "adapt" and "update" (and grammatical variants thereof), but these terms are generally given their art-recognized meanings.

The present invention concerns a method, algorithm, system, architecture and circuitry for adaptively filtering a digital data stream. The method generally comprises the steps of (a) processing a data sequence in accordance with the adaptive algorithm to produce a processed data sequence; (b) filtering the data sequence with a first set of filter characteristics to generate a filtered data term for the adaptive algorithm; (c) generating a filtered error term for the adaptive algorithm from at least the processed data sequence using a second set of filter characteristics, the second set of filter characteristics being similar to the first set of filter characteristics; and (d) updating the adaptive algorithm in response to the filtered data term and the filtered error term. A further aspect of the invention concerns software configured to implement and/or encode one or more of the methods disclosed herein.

A still further aspect of the invention concerns a signal processing architecture comprising (i) an equalizer configured to equalize and/or filter a data sequence in accordance with an adaptive algorithm and provide an equalized data output; (ii) a first filter, configured to receive the data sequence and generate a filtered data term for the adaptive algorithm; and (iii) an error term circuit, configured to receive the equalized data output and provide a filtered error term for the adaptive algorithm, the error term circuit comprising a second filter having filter characteristics similar to the first filter. An even further aspect of the invention concerns a system including the architecture and, for example, a receiver or a magnetic recording device.

The invention, in its various aspects, will be explained in greater detail below with regard to exemplary embodiments.

An Exemplary Method and Algorithm

In one aspect, the present invention relates to a method and algorithm for modifying an adaptive algorithm for processing data, comprising the steps of (a) processing a data sequence in accordance with the adaptive algorithm to produce a processed data sequence; (b) filtering the data sequence to generate a filtered data term for the adaptive algorithm; (c) filtering an error term for the adaptive algorithm generated from at least the processed data sequence, each of the filtering steps using a similar or identical set of filter characteristics; and (d) updating the adaptive algorithm in response to the filtered data term and the filtered error term. As will be explained below, the data sequence generally comprises digital data, and may comprise, for example, a digital data stream received in a data signal receiver, an equalized or filtered digital data stream, a processed digital data sequence, and/or an equalized sequence-processed digital data signal. The method and algorithm target certain error events that tend to dominate the set of errors in a given application, thereby improving the convergence rate without sacrificing performance (or filtering quality). In a preferred embodiment, a dominant error type comprises greater than 50% of the error events for the data processing application. In certain embodiments, the dominant error type comprises 80% or more of the error events.

For example, magnetic recording applications generally use read channel devices to receive and process magnetically recorded data. In read channel devices, when the recording density is below a certain threshold, single-bit error events can dominate the entire set of error events that occur in reading and processing magnetically recorded data. Exemplary recording density thresholds may be linear and/or areal, and may be 500 Mbit/in$^2$ or higher, preferably 5 Gbit/in$^2$ or higher, and more preferably 50 Gbit/in$^2$ or higher. Alternatively and/or additionally, exemplary recording density thresholds may be measured in flux changes per inch (FCI), and may be 50 kFCI or higher, preferably 100 kFCI or higher, and more preferably 500 kFCI or higher. In this case, targeting single-bit errors for minimization in the adaptive filtering algorithm may generate a lower sequence detection error rate.

Figure 3:
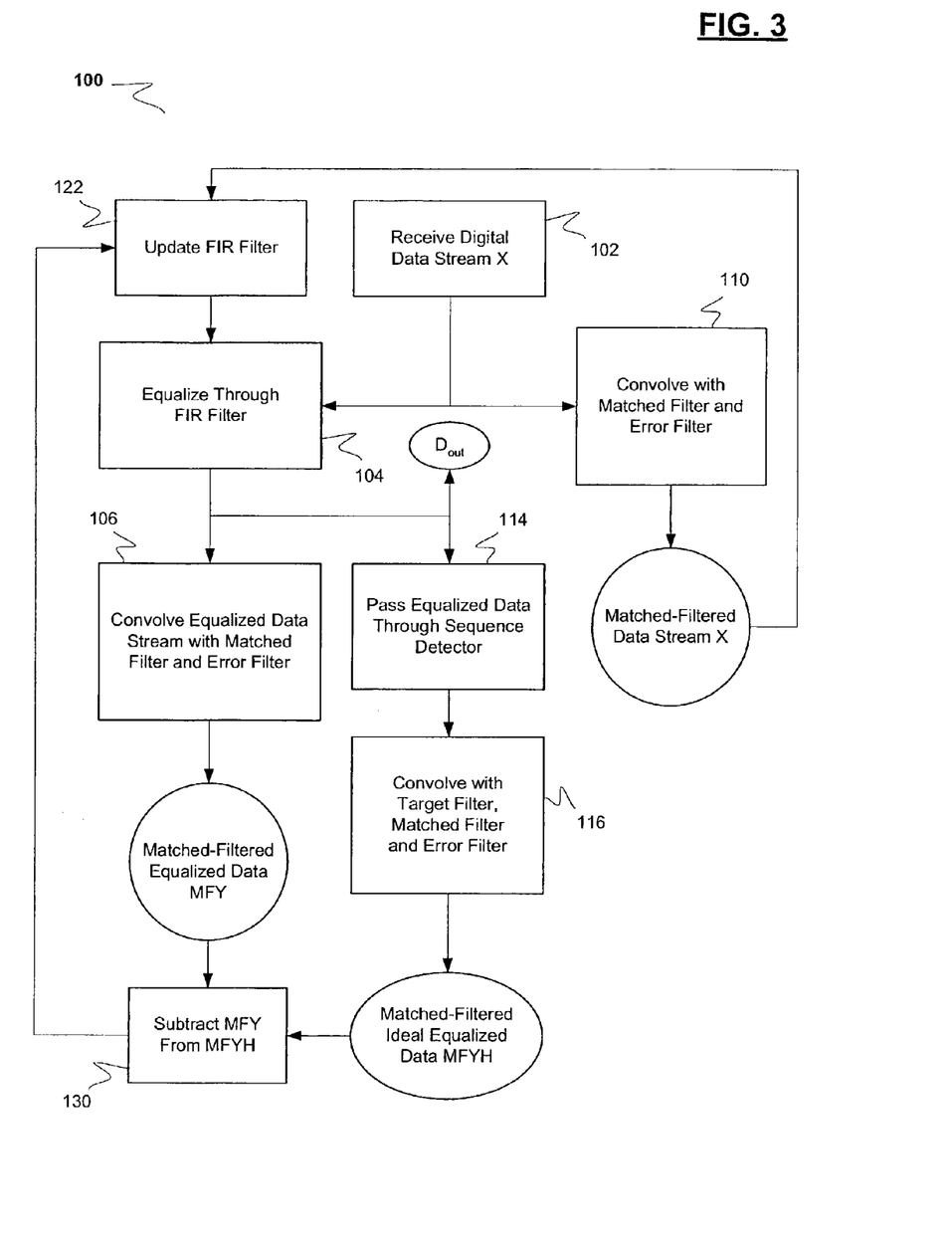
FIG. 3 is a flow chart for an embodiment of the present adaptive FIR filtering process.

FIG. 3 shows a flow chart for an exemplary process and/or algorithm 100 that targets certain dominant types of errors for minimization in adaptive filtering. As with FIG. 1, in first step 102, a digital data stream is received, for example in a conventional digital signal receiver. The primary function of the process 100 is reflected in step 104, in which the received digital data stream is equalized by processing it through a FIR filter to generate a data out signal $D^{OUT}$, similarly to FIGS. 1-2. The invention focuses on how the FIR filter is updated, using a new algorithm that targets certain predominant and/or fundamental error types.

For example, in an analysis for single-bit error events, one convolves the equalized data signal Y[k] through a matched filter and an error event filter (see, e.g., step 106 in FIG. 3). While a matched filter and error filter are particularly suited for the exemplary embodiment described herein, any filter suited for a particular application may be used. In this exemplary application, the error event filter may be optimized for minimizing RMS single-bit errors. The general equation for this part of the process is:

$$MFY[k] = Y[k] * \text{Matched-Filter} * \text{Error-Filter} \qquad (6)$$

The "matched filter" is a function that generally reverses the order of a given data sequence with respect to time. For example, if the channel from which the data sequence is taken has a target response of (a0, a1, a2, . . . an), the matched filter for this channel is just the transposition, or reverse sequence, of the channel response: (an, . . . a2, a1, a0). In the invention, n can be any integer such that the channel response and/or data sequence is capable of being processed by existing and/or the inventive circuitry and software. In preferred embodiments, n is at least 2, preferably at least 3. In common implementations of adaptive FIR filters for data signal processing, n is from 7 to 11 (i.e., the response or filter length is from 8 to 12 bits long).

In this embodiment, the error filter is an exact filter; that is, the error filter corresponds to the error itself. For example, the error filter for a single bit error is just the unit function (1). However, the invention is not limited to optimizing for single bit errors; for example, the optimized error filter for dibit error events is the (1,−1) function, the optimized error filter for tribit error events is (1,−1,1), etc. Depending on the application, this error filter list can be extended (e.g., to include four-bit, five-bit and/or larger error events), resized (e.g., to target minimization of error events of at least x bits, where x is an integer of 2, 3, 4 or more) and/or truncated (from x bits to y bits, where x is as described infra and y is an integer $\geq$x+1, x+2, etc.) as needed or desired. Of course, these error functions also include their complements, which are mathematically equivalent to the recited error filter functions.

Minimizing the output of the matched-filtered equalized data sequence MFY[k] should minimize the error rate for that particular error event. However, issues that now arise include how to minimize MFY[k] instead of Y[k].

The combined FIR (i.e., the FIR filter being updated) includes coefficients generated by the convolution of the main equalizing FIR, the matched filter and the error filter:

$$MFY = X * \text{FIR-filter} * \text{Matched-Filter} * \text{Error-Filter} \qquad (7)$$

In the present invention, the coefficients in the main FIR filter are to be adapted (see, e.g., step 122 in FIG. 3). The matched filter and error filter coefficients need not be adapted, but instead, may only be convolved (e.g., with a data signal) once their values are determined. Consequently, a new algorithm has been created that takes these factors into consideration.

For LMS-based adaptive filters to work effectively, the filter input and output should be available (e.g., to enable effective reception and transmission of equalized data). In addition, to take advantage of existing LMS update/adaptation rules, one may create or generate a matched-filtered version of the unequalized data sequence X. To accomplish this, equation (7) above may be rearranged in the following way:

$$MFY = (X * \text{Matched-Filter} * \text{Error-Filter}) * \text{FIR-filter} \qquad (8)$$

$$= MFX * \text{FIR-filter} \qquad (9)$$

In equations (8) and (9), MFY now becomes a vector available for adaptive LMS-based filtering. The value of MFX=(X*Matched-Filter*Error-Filter) is not necessarily an available vector for adaptive filtering under these conditions, nor is it required to be, so it may be (and generally is) explicitly and separately computed. For example, and as shown in step 110 of FIG. 3, the received digital data stream may be convolved with the matched filter and the error filter to generate a matched-filtered (but unequalized) data sequence MFX[k]. As is known in the art, the filter operations are commutative; i.e., the data stream may be convolved with the filters in any order.

The algorithm may now be transformed into a form typical of a regular or conventional adaptive FIR filter, thereby enabling one to update the weighting coefficients in a LMS-based FIR filter algorithm. The adaptation recursion equation may thus become:

$$C0 = C0 + \mu * MFE[k] * MFX[k] \quad (10)$$

$$C1 = C1 + \mu * MFE[k] * MFX[k-1] \quad (11)$$

$$\ldots$$

$$Cn = Cn + \mu * MFE[k] * MFX[k-n] \quad (12)$$

where MFE is the difference between MFY and its ideal noiseless value, MFYH. One may thus appreciate that an important aspect of the invention involves using structurally and/or functionally similar or identical filters to generate both the data term and the error term for the adaptive FIR algorithm.

MFE can be determined and/or generated by taking the difference between MFY and MFYH, preferably after correcting for the difference in the pipeline latencies of the various data receiving and/or processing blocks. FIG. 3 shows an exemplary sequence of process steps 114 and 116 for generating, determining and/or calculating MFYH. For example, equalized data sequence Y may be processed by a conventional sequence detector (see, e.g., step 114), then convolved with a conventional target filter, a matched filter (preferably, identical in structure and function to the matched filters for the equalized data sequence Y in step 106 and the received data sequence X in step 110), and an error filter (see, e.g., step 116; also preferably identical in structure and function to the error filter in steps 106 and 110).

FIG. 3 shows the process for generating M in step 130. Matched-filtered equalized data sequence MFY is subtracted from its ideal value MFYH using a conventional subtractor configured to operate on a data sequence having the length(s) of MFY and/or MFYH. Alternatively, MFY may be compared with MFYH in a conventional digital or analog comparator, and a value for any error in the equalized data signal may be determined using conventional digital and/or analog logic configured to do so. The error value can be incorporated into the adaptive FIR algorithm. For example, a comparison on digital signals may simply determine whether the equalized data and its corresponding ideal, noiseless value are the same or different, and if different, whether the difference is positive (e.g., 1) or negative (e.g., −1). A comparison of analog signals (or an analog comparison of digital signals) may involve comparing the equalized data and/or its corresponding ideal, noiseless value to each other or to a reference value, then amplifying the output of the comparison to obtain error data that can be used to update the FIR algorithm. Referring back to FIG. 3, the obtained MFE value is then used to update the FIR filter (along with the MFX[k] sequence) in step 122.

Alternatively, a mathematically equivalent process for generating MFE involves subtracting YH from Y (similar to the process described in FIG. 2) to generate an error term, then convolving the error term with a single matched filter and a single error filter to generate MFE. This alternative process eliminates one filter block from the architecture (compare, e.g., FIGS. 6 and 8), and may reduce the number hardware changes to previous designs.

Once the adaptive filtering algorithm has been converted into a form similar to the regular LMS gradient algorithm, the same techniques of simplification available for LMS can be applied to single bit error-optimized adaptive filtering. This includes using quantized values of MFX and/or MFE in place of their actual values. Thus, the (filtered) error and/or data terms for the adaptive algorithm also include quantized versions of the (filtered) error term and/or the (filtered) data term. In addition, $\mu$ need not be continuously updated. Rather, updates and/or changes to $\mu$ can be qualified (or preconditioned) on predetermined states of data from the sequence detector (or other data processing block configured to determine an actual value of data in the data sequence), or on changes in such data.

Figure 4A:
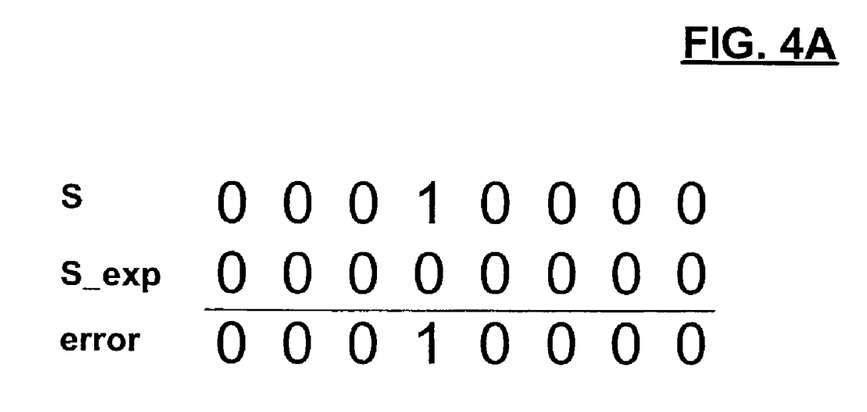
FIGS. 4A and 4B show examples of single bit error detection in accordance with the present invention.

Referring now to FIG. 4A, an example of single bit error detection is shown. Received data stream S (corresponding to received data signal X above) has the particular value shown (e.g., 0, 0, 0, 1, 0, 0, 0, 0). While the length of received data stream S is shown to be 8 bits, or 1 byte, this length can be any length conventionally used in the given application and/or for which appropriate data signal processing technology exists. Of course, the bits in received data stream S may have any conventional digital or analog value.

However, processing by signal processing circuitry (e.g., a conventional sequence detector and target filter) may determine that the ideal, noiseless value for S should be a value in which one bit differs. The ideal, noiseless value for S is shown in FIG. 3 as S_exp, or its expected value (e.g., 0, 0, 0, 0, 0, 0, 0, 0). The error value error (e.g., 0, 0, 0, 1, 0, 0, 0, 0) is determined by subtracting S_exp from S, and the FIR filter is modified to reflect a new C(4) value in accordance with conventional techniques (see, e.g., "Digital Baseband Transmission and Recording," by J. W. M. Bergmans, Kluwer Academic Publishers, Dordrecht, The Netherlands (1996), pp. 373-450, the relevant portions of which are incorporated herein by reference).

Figure 4B:
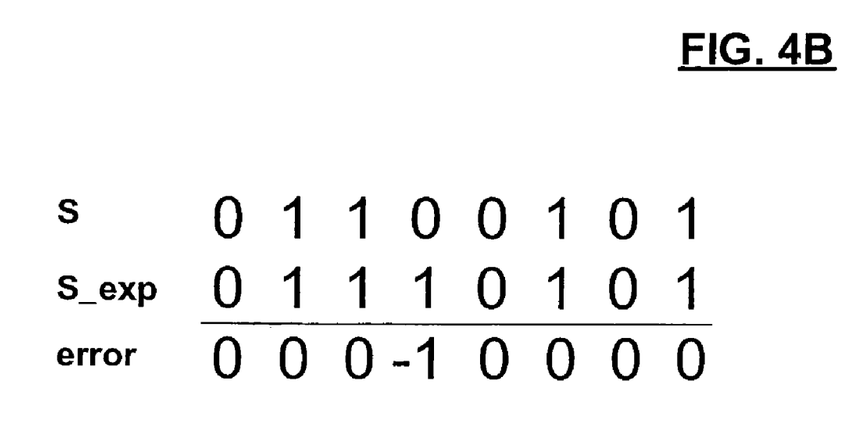

FIG. 4B shows a complementary error (i.e., one in which the error value error is 0, 0, 0, −1, 0, 0, 0, 0). While the actual value of error in FIG. 4B differs from that in FIG. 4A, its absolute value is the same. Consequently, the same result (i.e., updating the FIR algorithm coefficient) will be obtained. Thus, the single bit error function employed in this embodiment of the present filtering method and algorithm effectively minimizes single bit error events.

Figure 5:
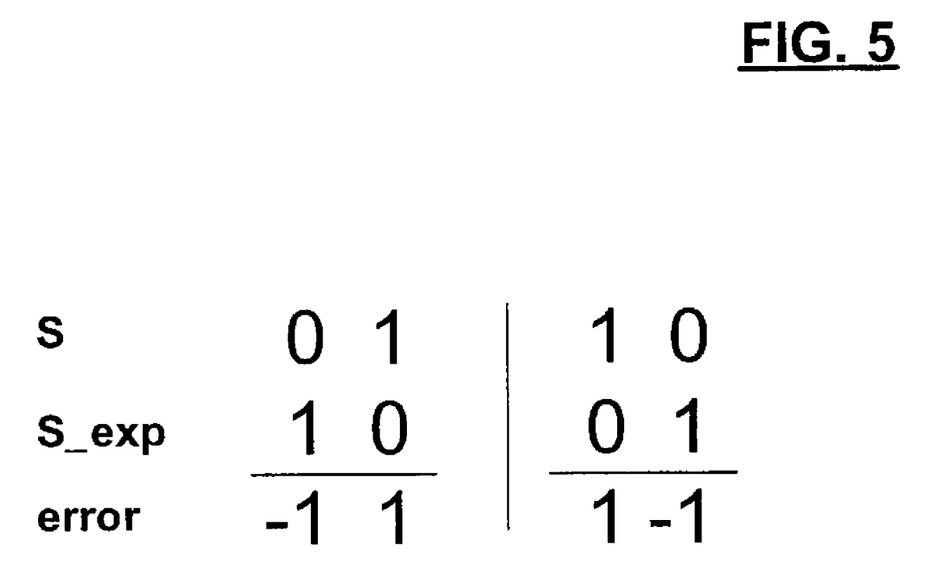
FIG. 5 shows examples of dibit error detection in accordance with the present invention.

Referring now to FIG. 5, two examples of dibit error detection are shown. Received data stream S has the particular value shown (e.g., 0,1 or 1,0). In contrast, S_exp (e.g., the ideal, noiseless value of S) is determined to be (1,0) or (0,1), respectively. The error value error is thus (−1,1) or (1,−1), respectively.

While the concept of the invention is to target the adaptive algorithm to minimize predominant error events, the exemplary embodiment of the invention described herein is ideally suited to minimizing single bit error events. For those error events that may not be targeted and/or optimally minimized in the present method and/or algorithm, a second and/or different adaptation algorithm can be employed to thereby minimize infrequent, secondary or less significant RMS errors.

Exemplary Software

Although the description herein tends to focus on methods and hardware (e.g., architectures, systems and/or circuits), the present invention also includes a computer program and/ or software, implementable and/or executable in a general purpose computer or workstation equipped with a conventional digital signal processor, configured to perform one or more steps of the method and/or one or more operations of the hardware. Thus, a further aspect of the invention relates to software that implements the above method and/or algorithm. For example, the invention may further relate to a computer program, computer-readable medium or waveform containing a set of instructions which, when executed by an appropriate signal processing device, is configured to perform the above-described method and/or algorithm.

For example, the computer-readable medium may comprise any medium that can be read by a signal processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional network cable, a conventional optical data transmission cable, or even air or a vacuum (e.g., outer space) for wireless signal transmissions. The waveform and/or code are generally digital, and are generally configured for processing by a conventional digital data processor (e.g., a microprocessor, microcontroller, or logic circuit such as a programmable gate array, programmable logic circuit/device or application-specific [integrated] circuit).

Exemplary Architectures

The present signal processing architecture generally comprises (i) an equalizer configured to equalize and/or filter a data sequence in accordance with an adaptive algorithm and provide an equalized data output; (ii) a first filter, configured to receive the data sequence and generate a filtered data term for the adaptive algorithm; and (iii) an error term circuit, configured to receive the equalized data output and provide a filtered error term for the adaptive algorithm, the error term circuit comprising a second filter having filter characteristics similar to the first filter. Thus, the present architecture may be implemented as circuitry or circuit blocks on one or more integrated circuits, as a hardware description of a circuit (e.g., in VHDL or a Verilog® description), in a monolithic integrated circuit, or in a plurality of discrete devices on a circuit board.

Figure 6:
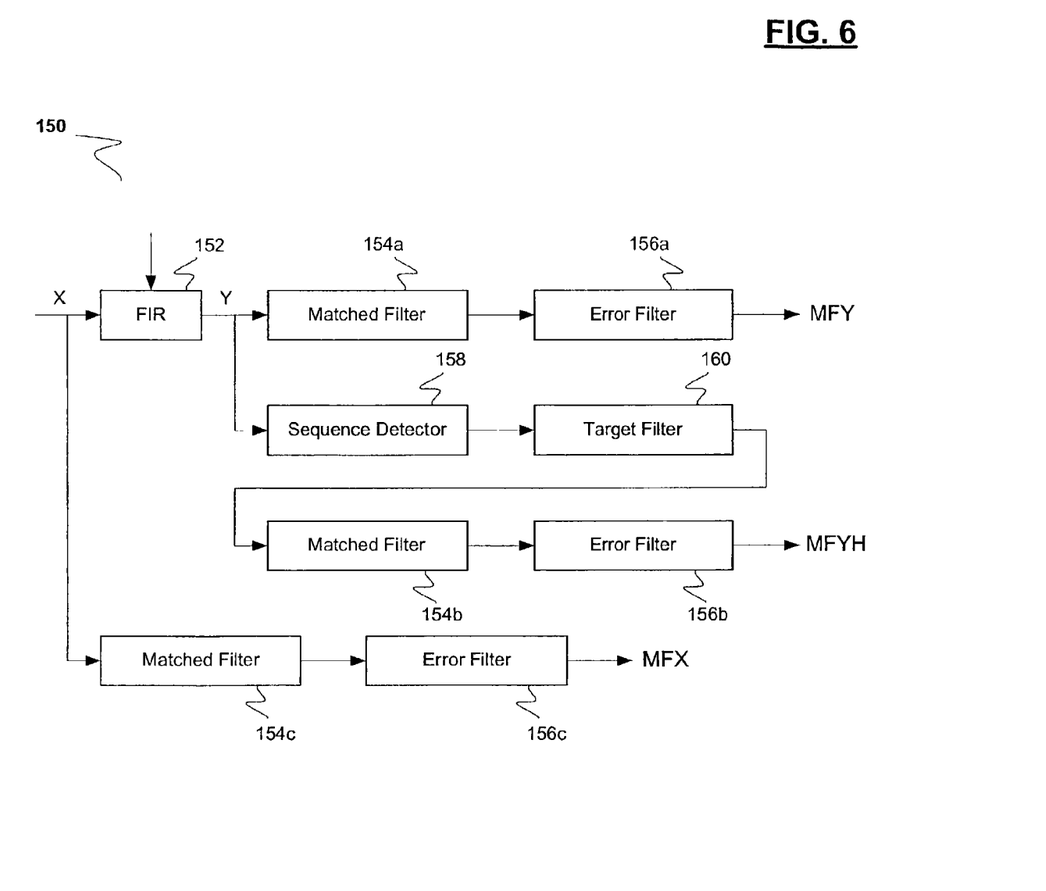
FIG. 6 is a block diagram showing a first embodiment of an architecture configured to implement the adaptive FIR filtering process of FIG. 3.

FIG. 6 shows a first exemplary architecture 150, configured to implement and/or execute the above method, algorithm and/or software. This embodiment includes FIR filter 152, matched filter blocks 154a, 154b and 154c, error filter blocks 156a, 156b and 156c, sequence detector 158 and target filter 160.

In essence, architecture 150 comprises three signal processing paths: (1) a first filtering path configured to generate a matched-filtered data signal MFX from received data X, (2) a second filtering path configured to generate a matched-filtered equalized data signal MFY from equalized data Y, and (3) an equalized data processing path configured to generate an ideal, noiseless equalized data signal MFYH from equalized data Y. Each such path comprises a filter block including a matched filter 154 and an error filter 156. In one implementation, each of matched filter blocks 154a, 154b and 154c are structurally and/or functionally identical to each other. In a further implementation, each of error filter blocks 156a, 156b and 156c are structurally and/or functionally identical to each other. In a preferred embodiment, the architecture further includes a conventional adaptive FIR filter 152. More specifically, the second filtering path further includes adaptive FIR filter 152, and is configured to generate a matched-filtered equalized data signal MFY from received data X.

Figure 7:
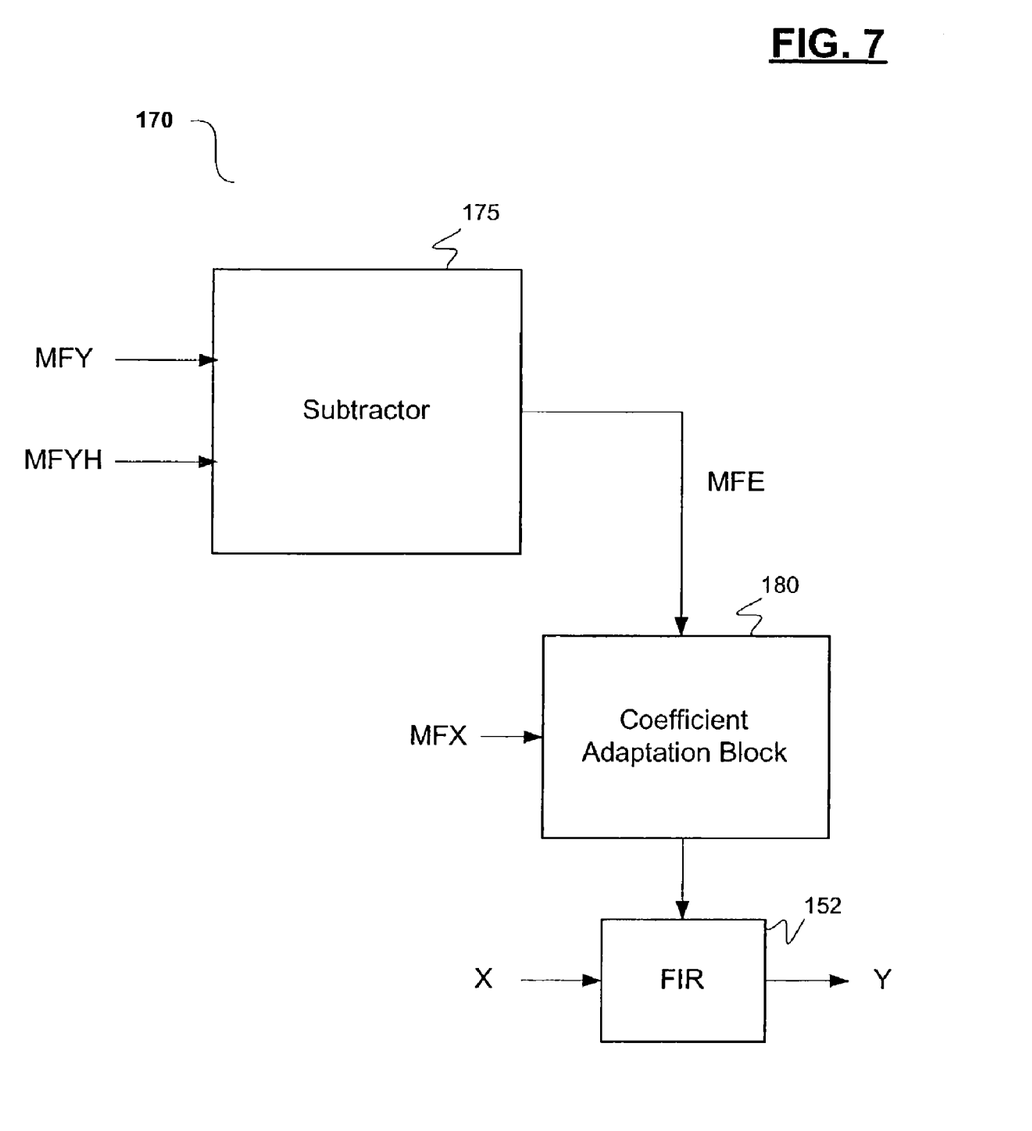
FIG. 7 is a block diagram of a hardware embodiment for updating the adaptive FIR filter of FIG. 6.

FIG. 7 shows an embodiment of a circuit and/or architecture 170 that updates the LMS algorithm of the adaptive FIR filter 152 using matched-filtered equalized data signal MFY and ideal, noiseless equalized data signal MFYH. For example, a subtractor 175 may be configured to receive the two signals MFY and MFYH. As described above, subtractor 175 may subtract ideal, noiseless signal MFYH from signal MFY. Alternatively, and particularly when the signals are digital, signal MFY may be subtracted from ideal, noiseless signal MFYH, but the former configuration is preferred over the latter. Also, a conventional comparator configured to operate on the two signals MFY and MFYH as described above with regard to the present method may be substituted for subtractor 175.

As described above, the difference between MFY and MFYH may comprise MFE[k], the matched-filtered error term used to update the adaptive algorithm employed in FIR filter 152. When MFY and MFYH are the same, MFE is zero, and coefficient adaptation block 180 does not change the adaptive FIR algorithm. When MFY and MFYH are not identical, MFE is non-zero, and coefficient adaptation block 180 may modify or change the adaptive algorithm. However, even when MFE is zero, coefficient adaptation block 180 may be continuously or periodically updating the adaptive FIR algorithm.

In another aspect, the present invention concerns an alternative architecture configured to implement adaptive FIR filtering that includes a FIR filter, a data signal processor, a matched filter block, and a conventional subtractor circuit. An example of such an architecture is shown in FIG. 8.

Figure 8:
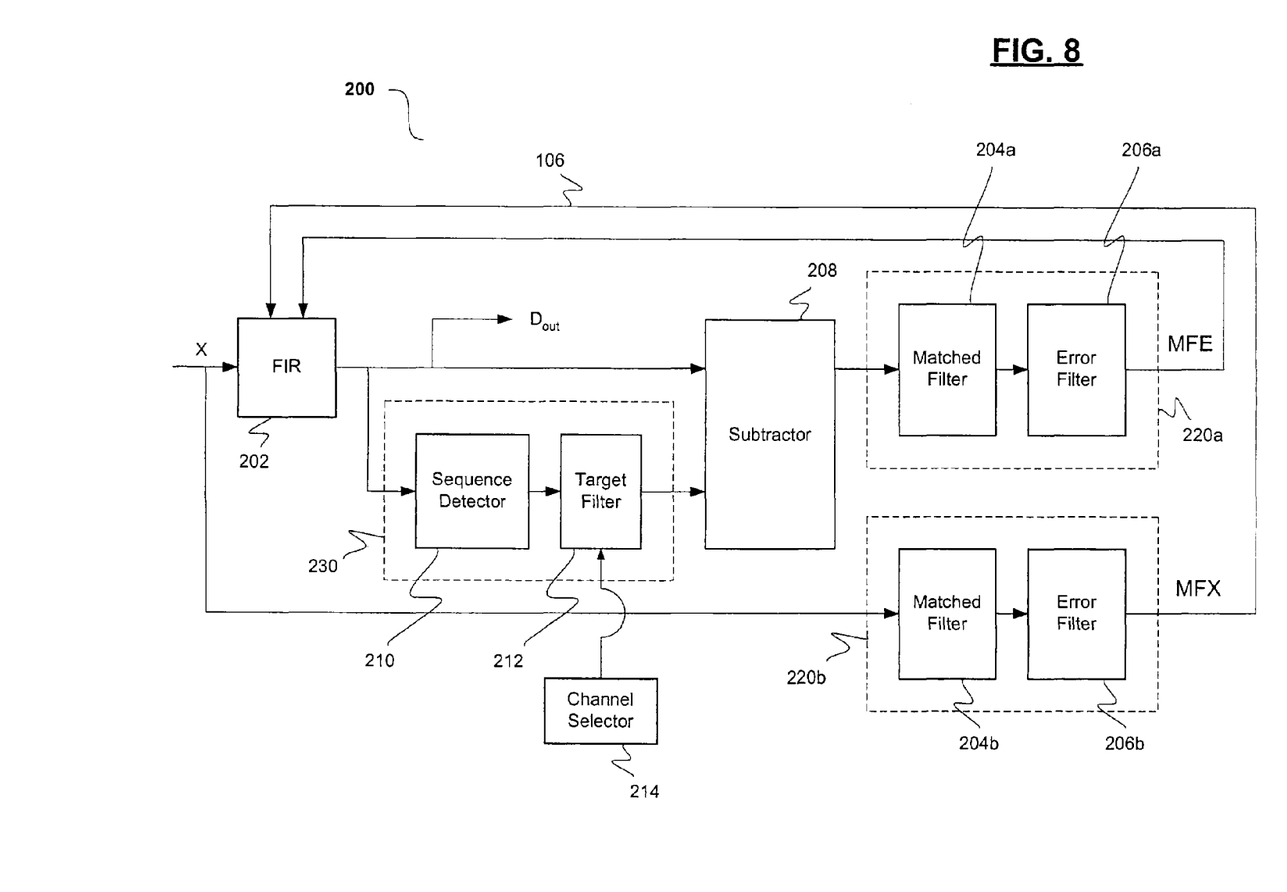
FIG. 8 is a block diagram showing a second embodiment of an architecture configured to implement the adaptive FIR filtering process of FIG. 3.

As for the first architecture embodiment, in the architecture 200 of FIG. 8, a data signal X is received by a conventional data signal receiving apparatus, device, circuit or circuit block (not shown), and input into one or more functional blocks. One such functional block is FIR filter 202, configured to output an equalized data signal $D_{OUT}$. The equalized data signal $D_{OUT}$ may also be input into subtractor block 208.

Alternatively or additionally, equalized data signal $D_{OUT}$ may be input into a signal processing block 230. In a preferred embodiment, signal processing block 230 comprises a conventional sequence detector 210 and a conventional target filter 212, although any processor block configured to perform a data signal processing operation on a received data signal may be employed. More specifically, and in accordance with the above method and algorithm, sequence detector 210 is configured to receive equalized data signal $D_{OUT}$, and conventional target filter 212 is configured to be convolved with equalized data signal $D_{OUT}$ after sequence detection. Alternatively, target filter 212 may be configured to receive equalized data signal $D_{OUT}$, and conventional sequence detector 210 may be convolved with equalized data signal $D_{OUT}$ after target filtering. The output of signal processing block 230 may be input into subtractor block 208 for comparison to and/or subtraction from equalized data signal $D_{OUT}$. Architecture 200 may further comprise a conventional channel selector block 214, configured to select a target channel in the receiver and provide corresponding filter function and/or algorithm information to target filter block 212.

Matched filter block 220a may comprise matched filter 204a and error filter 206a. Matched filter 204a receives the output from subtractor block 208, and error filter 206a may be configured to receive the output from matched filter 204a. Alternatively, error filter 206a may be configured to receive the output from subtractor block 208, and matched filter 204a may be configured to receive the output from error filter 206a. In either case, the output of matched filter block 220a is the error term for the adaptive FIR algorithm, MFE[k].

Alternatively, subtractor 208 may be replaced with a conventional digital or analog comparator, optionally including logic sufficient to determine a value for any error in the equalized data signal, where the error value can be incorporated into the adaptive FIR algorithm after convolution with matched filter block 220a. The conventional digital comparator may simply comprise digital logic gates configured to determine whether the equalized data and its corresponding ideal, noiseless value are the same or different, and if different, whether the difference is positive (e.g., 1) or negative (e.g., −1).

Received data signal X is also processed by a matched filter block 220b, which is similar (and preferably, identical) in structure and function to matched filter block 220a. Thus, one key to the invention is processing of the error term and of the data signal by functionally and/or structurally similar or identical filters. As one can easily see, the common structures to the various data signal processing paths in the exemplary architectures of FIGS. 6 and 7 are the matched filter and error filter.

Of course, the architecture may further comprise any of the function blocks disclosed herein. For example, the architecture may further comprise a FIR filter, a signal processor (which, in turn, may comprise a sequence detector and/or a target filter), and/or a subtractor or comparator. The filter circuitry is generally conventional, and typically includes a conventional adder and/or multiplier, depending on the function(s) and/or mathematical operation(s) to be performed.

An Exemplary System and Network

A further aspect of the present invention concerns systems for reading magnetically recorded data, generally including the architecture and, for example, a receiver and/or magnetic recording device. In one embodiment, the system comprises the present signal processing architecture and at least one receiver communicatively coupled to the architecture for receiving a data signal.

The present system may further include details of the architectures described above. For example, the system may include an equalizer that comprises an adaptive finite impulse response (FIR) filter. Preferably, the adaptive FIR filter employs a least-mean-square (LMS) algorithm. The system may also include a signal processor that comprises a sequence detector and/or a target filter; an error filter configured to receive the matched filtered output and/or to minimize single bit error events, a dibit error event, and/or a tribit error event.

The system may further comprise a second matched filter, configured to receive signal-processed (e.g., sequence detected) data and provide matched-filtered processed data. Preferably, the system further comprises a third matched filter, configured to receive the incoming data stream and provide a matched-filtered (received) data signal. In such embodiments, the system preferably also comprises (1) a second error filter configured to receive the matched filtered processed data and output an ideal matched filtered output, and/or (2) a third error filter configured to receive the matched filtered data signal and provide an equalizer algorithm component.

The system may also further comprise a subtractor configured to receive the matched-filtered output and the ideal matched filtered output. While the subtractor generally subtracts one of the matched-filtered output and the ideal matched filtered output from the other, it preferably subtracts the ideal matched filtered output from the matched-filtered output. The subtractor may provide the update signal that updates or modifies the LMS algorithm in the FIR filter. Alternatively, the subtractor may be replaced by a comparator configured to compare the matched-filtered output and the ideal matched filtered output, but the subtractor implementation is preferred.

The invention also relates to a magnetic recording system, comprising the present system and a magnetic storage device, communicatively coupled to the system. The magnetic storage device may comprise a floppy disk, a CD-ROM, a magnetic tape or a hard disk drive. The system may be part of a read channel device. The present magnetic recording system and/or device may employ the matched-filtered LMS algorithm and filtering method described in detail above.

CONCLUSION/SUMMARY

Thus, the present invention provides a method, algorithm, software, architecture, system and circuit for adaptively filtering a received data signal that targets certain predominant error events for minimization. The error events to be minimized are generally those that occur most often in a given data signal processing application. For example, single bit error events in sequence detection occur most frequently in reading magnetically recorded data. Thus, an adaptive algorithm targeting single bit error events for minimization in magnetic media read applications will converge much more rapidly than a conventional LMS algorithm without significantly sacrificing quality (particularly if one or more additional algorithms are used to target the secondary error events).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for adaptively updating coefficients in a filter for processing data, comprising the steps of:
   a) receiving a data sequence in the filter and processing the data sequence in accordance with the coefficients in the filter to produce a processed data sequence;
   b) separately filtering the data sequence with a first set of filter characteristics to generate a filtered data term for the coefficients;
   c) filtering the processed data sequence using a second set of filter characteristics, said second set of filter characteristics being structurally and/or functionally identical to said first set of filter characteristics;
   d) generating a filtered ideal processed data sequence from the processed data sequence using a third set of filter characteristics, said third set of filter characteristics comprising a subset of filter characteristics structurally and/or functionally identical to said first filter characteristics;
   e) generating a filtered error term for the coefficients from the filtered processed data sequence and the filtered ideal processed data sequence; and
   f) updating the coefficients in the filter of step a with each of said filtered data term and said filtered error term.

2. The method of claim 1, wherein filtering the processed data sequence comprises convolving the processed data sequence with said second set of filter characteristics to generate the filtered processed data sequence.

3. The method of claim 2, wherein generating the filtered error term comprises determining a difference between the filtered processed data sequence and the filtered ideal processed data sequence.

4. The method of claim 3, further comprising (i) detecting a sequence of said processed data sequence, and (ii) convolving said sequence-detected processed data sequence with said third set of filter characteristics to generate said filtered ideal processed data sequence.

5. The method of claim 1, wherein said first set of filter characteristics is identical to said second set of filter characteristics.

6. The method of claim 1, wherein at least part of said third set of filter characteristics is identical to said first and second sets of filter characteristics.

7. The method of claim 1, wherein generating the filtered ideal processed data sequence comprises further processing said processed data sequence with a sequence detector, and convolving said sequence-detected processed data sequence with the third set of filter characteristics.

8. The method of claim 1, wherein each of said first and second sets of filter characteristics comprises an error filter.

9. The method of claim 8, wherein said filtering further comprises transposing a channel response to generate at least a subset of said first set of filter characteristics.

10. The method of claim 1, wherein said data sequence comprises a digital data signal.

11. The method of claim 1, wherein said processing step a) comprises equalizing said data sequence, said processed data sequence comprises an equalized data signal, said filtered processed data sequence comprises a filtered equalized data signal, and said ideal filtered processed data sequence comprises an ideal filtered equalized data signal.

12. The method of claim 1, wherein said first and second sets of filter characteristics are configured to minimize a dominant error type.

13. The method of claim 12, wherein said dominant error type comprises a single bit error.

14. The method of claim 13, wherein said first and second sets of filter characteristics are further configured to minimize a dibit error.

15. The method of claim 1, wherein said third set of filter characteristics comprises an error filter and a target filter.

16. The method of claim 8, wherein said third set of filter characteristics comprises said error filter and a target filter.

17. A computer-readable medium containing a set of instructions which, when executed by a signal processing device configured to execute computer-readable instructions, is configured to perform a method comprising:

processing a data sequence in accordance with coefficients in a filter to produce a processed data sequence;

separately filtering the data sequence with a first set of filter characteristics to generate a filtered data term;

filtering the processed data sequence using a second set of filter characteristics, said second set of filter characteristics being structurally and/or functionally identical to said first set of filter characteristics;

generating a filtered ideal processed data sequence from the processed data sequence using a third set of filter characteristics, said third set of filter characteristics comprising a subset of filter characteristics structurally and/or functionally identical to said first of filter characteristics;

generating a filtered error term for the coefficients from the filtered processed data sequence and the filtered ideal processed data sequence; and updating the coefficients in the filter with each of said filtered data term and said filtered error term.

18. The computer-readable medium of claim 17, wherein said coefficients are for an adaptive finite impulse response (FIR) algorithm.

19. The computer-readable medium of claim 18, wherein said coefficients are derived from a least-mean-squares (LMS) gradient algorithm.

20. The computer-readable medium of claim 17, wherein said processing step a) comprises equalizing said data sequence.

21. The computer-readable medium of claim 17, wherein generating the filtered ideal processed data sequence comprises (i) detecting a sequence of said processed data sequence, and (ii) convolving said sequence-detected, processed data sequence with said third set of filter characteristics.

22. The computer-readable medium of claim 21, wherein generating said filtered error term comprises subtracting the ideal filtered processed data sequence from the filtered processed data sequence.

23. The computer-readable medium of claim 17, wherein each of said first and second sets of filter characteristics comprises an error filter.

24. The computer-readable medium of claim 17, wherein said method further comprises minimizing a dominant error type.

25. The computer-readable medium of claim 24, wherein said dominant error type comprises a single bit error.

26. The computer-readable medium of claim 17, wherein said set of instructions comprises object code, source code and/or binary code.

27. The computer-readable medium of claim 17, wherein said set of instructions comprises digital code configured for processing by a digital data processor.

28. The computer-readable medium of claim 23, wherein said third set of filter characteristics comprises said error filter and a target filter.

29. The computer-readable medium of claim 17, wherein filtering the processed data sequence comprises convolving the processed data sequence with said second set of filter characteristics to generate the filtered processed data sequence.

30. A signal processing architecture, comprising:

a) an equalizer configured to equalize and/or filter a data sequence in accordance with filter coefficients and provide an equalized data output;

b) a separate first filter, configured to receive said data sequence and generate a filtered data term for updating said filter coefficients of part a; and c) an error term circuit, configured to receive said equalized data output and provide a filtered error term for updating said filter coefficients of part a from a filtered equalized data output and a filtered ideal equalized data output, said error term circuit comprising a second filter having filter characteristics structurally and/or functionally identical to said first filter, configured to filter said equalized data output; a signal processor configured to provide an ideal equalized data output from the equalized data output; and a third filter configured to filter said ideal equalized data output, having a subset of filter characteristics structurally and/or functionally identical to said first filter.

31. The architecture of claim 30, wherein said equalizer comprises an adaptive finite impulse response (FIR) filter.

32. The architecture of claim 31, wherein said filter coefficients are derived from a least-mean-square (LMS) algorithm.

33. The architecture of claim 30, wherein said signal processor comprises a sequence detector.

34. The architecture of claim 30, wherein said error term circuit further comprises a target filter configured to receive an output from said signal processor and provide said ideal equalized data output.

35. The architecture of claim 30, wherein said second filter receives said equalized data output and provides said filtered equalized data output.

36. The architecture of claim 30, wherein said third filter comprises a target filter.

37. The architecture of claim 36, wherein said third filter further comprises an error filter.

38. The architecture of claim 30, further comprising a subtractor or comparator configured to (i) receive said filtered equalized data output and said filtered ideal equalized data output, and (ii) provide said filtered error term.

39. The architecture of claim 38, wherein said subtractor or comparator comprises said subtractor, and said subtractor is further configured to subtract one of said filtered equalized data output and said ideal filtered equalized data output from the other of said filtered equalized data output and said ideal filtered equalized data output.

40. The architecture of claim 30, wherein each of said first and second filters comprises an error filter.

41. The architecture of claim 40, wherein each of said first and second filters further comprises a matched filter.

42. The architecture of claim 40, wherein said error filter is configured to minimize one or more dominant error types.

43. The architecture of claim 42, wherein said one or more dominant error types comprise a single bit error event.

44. The architecture of claim 30, further comprising a receiver configured to receive data from a magnetic storage medium and provide said data sequence.

45. The architecture of claim 30, wherein said second filter is identical to said first filter.

46. The architecture of claim 45, wherein a portion of said third filter is structurally and/or functionally identical to said first and second filters.

47. The architecture of claim 40, wherein said third filter comprises an error filter.

48. The architecture of claim 47, wherein said third filter further comprises a target filter.

49. The architecture of claim 41, wherein said third filter comprises an error filter and a matched filter.

50. The architecture of claim 49, wherein said third filter further comprises a target filter.

51. The architecture of claim 43, wherein said first and second filters are further configured to minimize a dibit error.

52. A system for reading magnetically recorded data, comprising:
a) the architecture of claim 30; and
b) at least one receiver communicatively coupled to said architecture for receiving said first data sequence.

53. The system of claim 52, wherein said equalizer comprises an adaptive finite impulse response (FIR) filter.

54. The system of claim 53, wherein said filter coefficients are derived from a least-mean-square (LMS) algorithm.

55. The system of claim 52, wherein said signal processor comprises a sequence detector configured to receive said equalized data output and provide a sequence-detected equalized data output.

56. The system of claim 55, wherein said error term circuit further comprises a target filter configured to receive an output from said sequence detector and provide said ideal equalized data output.

57. The system of claim 55, said third filter comprising a portion structurally and/or functionally identical to said first and second filters.

58. The system of claim 57, wherein said third filter further comprises a target filter.

59. The system of claim 56, wherein said second filter receives said equalized data output and provides a filtered equalized data output.

60. The system of claim 59, wherein said error term circuit further comprises a fourth filter configured to receive said ideal equalized data output and provide a filtered ideal equalized data output.

61. The system of claim 60, further comprising a subtractor or comparator configured to (i) receive said filtered equalized data output and said filtered ideal equalized data output, and (ii) provide said filtered error term.

62. The system of claim 52, wherein each of said first and second filters comprises an error filter.

63. The system of claim 62, wherein each of said first and second filters further comprises a matched filter.

64. The system of claim 62, wherein said error filter is configured to minimize one or more dominant error types.

65. The system of claim 64, wherein said one or more dominant error types comprise a single bit error event.

66. The system of claim 52, wherein said second filter is identical to said first filter.

67. A magnetic recording system, comprising:
a) the system of claim 52; and
b) a magnetic storage device, communicatively coupled to said system.

68. The magnetic recording system of claim 67, wherein said magnetic storage device comprises a floppy disk, a CD-ROM, a magnetic tape or a hard disk drive.

* * * * *